United States Patent
Zhang et al.

(10) Patent No.: US 11,947,829 B2
(45) Date of Patent: Apr. 2, 2024

(54) DATA WRITING METHOD, DEVICE, STORAGE SERVER, AND COMPUTER READABLE STORAGE MEDIUM

(71) Applicant: Tencent Technology (Shenzhen) Company Limited, Shenzhen (CN)

(72) Inventors: Yu Zhang, Shenzhen (CN); Ke Zhou, Shenzhen (CN); Hua Wang, Shenzhen (CN); Jianying Hu, Shenzhen (CN); Yongguang Ji, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 17/523,730

(22) Filed: Nov. 10, 2021

(65) Prior Publication Data
US 2022/0066691 A1    Mar. 3, 2022

Related U.S. Application Data

(63) Continuation of application No. PCT/CN2020/119881, filed on Oct. 9, 2020.

(30) Foreign Application Priority Data

Dec. 17, 2019 (CN) .......................... 201911304631.1

(51) Int. Cl.
*G06F 12/02* (2006.01)
*G06F 3/06* (2006.01)
*G06N 20/00* (2019.01)

(52) U.S. Cl.
CPC .......... *G06F 3/0655* (2013.01); *G06F 3/0604* (2013.01); *G06F 3/0679* (2013.01); *G06N 20/00* (2019.01)

(58) Field of Classification Search
CPC ............. G06F 12/0868; G06F 12/0888; G06F 2212/1016; G06F 2212/154;
(Continued)

(56) References Cited

U.S. PATENT DOCUMENTS

2012/0117345 A1    5/2012  Kaneda et al.
2019/0163409 A1*   5/2019  Li ....................... G06F 12/0868
(Continued)

FOREIGN PATENT DOCUMENTS

CN    101201735 A    6/2008
CN    103049395 A    4/2013
(Continued)

OTHER PUBLICATIONS

Tencent Technology, WO, PCT/CN2020/119881, dated Jan. 20, 2021, 4 pgs.
(Continued)

*Primary Examiner* — Yong J Choe
(74) *Attorney, Agent, or Firm* — Morgan, Lewis & Bockius LLP

(57) ABSTRACT

This application discloses a data writing method, device, a storage server and a computer readable storage medium, including: writing, when a write request is received, write data corresponding to the write request to a write buffer; acquiring historical access data of a data block corresponding to to-be-flushed data in the write buffer when a data flushing operation is triggered for the write buffer; determining whether the to-be-flushed data is write-only data based on the historical access data by using a pre-trained classifier; if yes, writing the to-be-flushed data to a hard disk drive; and if no, writing the to-be-flushed data to a cache. The data writing method provided by this application can effectively reduce the traffic of writing dirty data to the cache while reserving more space in the cache for the ordinary
(Continued)

data, thereby improving the utilization of the cache space and the read hit rate of the cache.

20 Claims, 7 Drawing Sheets

(58) Field of Classification Search
CPC ......... G06F 2212/217; G06F 2212/314; G06F 2212/502; G06F 3/0604; G06F 3/061; G06F 3/0655; G06F 3/0656; G06F 3/0676; G06F 3/0679
See application file for complete search history.

(56) References Cited

U.S. PATENT DOCUMENTS

| | | |
|---|---|---|
| 2019/0278659 A1 | 9/2019 | Balasubramanian et al. |
| 2021/0064286 A1* | 3/2021 | Jung ................... G06F 3/0656 |

FOREIGN PATENT DOCUMENTS

| | | |
|---|---|---|
| CN | 103942010 A | 7/2014 |
| CN | 104461935 A | 3/2015 |
| CN | 104571954 A | 4/2015 |
| CN | 107710169 A | 2/2018 |
| CN | 109947363 A | 6/2019 |
| CN | 110007870 A | 7/2019 |
| CN | 110019210 A | 7/2019 |
| CN | 110262758 A | 9/2019 |
| CN | 111104066 A | 5/2020 |

OTHER PUBLICATIONS

Tencent Technology, IPRP, PCT/CN2020/119881, dated May 17, 2022, 5 pgs.
Tencent Technology, ISR, PCT/CN2020/119881, dated Jan. 20, 2021, 2 pgs.

* cited by examiner

DATA WRITING METHOD, DEVICE, STORAGE SERVER, AND COMPUTER READABLE STORAGE MEDIUM

CROSS-REFERENCE TO RELATED APPLICATIONS

This application is a continuation application of PCT Patent Application No. PCT/CN2020/119881, entitled "DATA WRITING METHOD AND APPARATUS, AND STORAGE SERVER AND COMPUTER-READABLE STORAGE MEDIUM" filed on Oct. 9, 2020, which claims priority to Chinese Patent Application No. 201911304631.1, filed with the State Intellectual Property Office of the People's Republic of China on Dec. 17, 2019, and entitled "DATA WRITING METHOD, DEVICE, STORAGE SERVER, AND COMPUTER READABLE STORAGE MEDIUM", all of which are incorporated herein by reference in their entirety.

FIELD OF THE TECHNOLOGY

This application relates to the field of storage technologies, and specifically, to a data writing technology.

BACKGROUND OF THE DISCLOSURE

When a client generates a write request, a storage server determines whether to load to-be-written data to a cache and when to flush dirty data in the cache to a back-end hard disk drive according to a write policy. Therefore, the write policy has a great impact on system performance, data consistency, and write traffic to a cache medium.

In related art, there are three basic write policies: write-through policy, write-back policy, and write-around policy. The write-through policy is used for writing the to-be-written data to the cache and the back-end hard disk drive simultaneously; the write-back policy is used for writing the to-be-written data to the cache first, and then asynchronously flush the to-be-written data to the back-end hard disk drive; the write-around policy is used for directly writing the to-be-written data to the back-end hard disk drive, and according to the write-around policy, missing data is loaded to the cache only when there is a read operation.

In ever-changing and diverse cloud workloads, a fixed write policy is bound to be inefficient. Therefore, how to raise the efficiency of write policies is a technical problem to be solved by a person skilled in the art.

SUMMARY

This application provides a data writing method, a data writing device, a storage server, and a computer readable storage medium that can effectively improve efficiency of write policies.

To achieve the foregoing objective, a first aspect of this application provides a data writing method, performed by a computer device (e.g., a server), including:
  writing, when a write request is received, write data corresponding to the write request to a write buffer;
  acquiring historical access data of a data block corresponding to to-be-flushed data in the write buffer when a data flushing operation is triggered for the write buffer;
  determining whether the to-be-flushed data is write-only data based on the historical access data;
  in accordance with a determination that the to-be-flushed data is the write-only data, writing the to-be-flushed data to a hard disk drive; and
  in accordance with a determination that the to-be-flushed data is not the write-only data, writing the to-be-flushed data to a cache.

To achieve the foregoing objective, a second aspect of this application provides a computer device (e.g., a storage server), including:
  a processor and a memory;
  the memory storing a plurality of computer programs, and the computer programs, when executed by the processor, causing the computer device to perform the data writing method provided by the first aspect.

To achieve the foregoing objective, a third aspect of this application provides a non-transitory computer readable storage medium. The non-transitory computer readable storage medium stores a plurality of computer programs, and the computer programs implementing the data writing method provided by the first aspect.

It can be learned from the above solutions that a data writing method provided by this application includes: writing, when a write request is received, write data corresponding to the write request to a write buffer; acquiring historical access data of a data block corresponding to to-be-flushed data in the write buffer when a data flushing operation is triggered for the write buffer; determining whether the to-be-flushed data is write-only data based on the historical access data; in accordance with a determination that the to-be-flushed data is the write-only data, writing the to-be-flushed data to a hard disk drive; and in accordance with a determination that the to-be-flushed data is not the write-only data, writing the to-be-flushed data to a cache.

In this application, data generated by the client is divided into different types: write-only data and ordinary data. Considering that write-only data is only for write operations within a certain time window and not for read operations, loading the write-only data to the cache not only will not increase a read hit rate of the cache, but will also cause a large amount of unnecessary write traffic to the cache. Therefore, the data writing method provided by this application determines the type of to-be-flushed data in the write buffer, so that the write-only data and the ordinary data can be written in different manners. Specifically, the ordinary data is written to the cache using the write-through policy or the write-back policy, while the write-only data is written directly to the back-end hard disk drive using the write-around policy. In this manner, the useless traffic written to the cache can be effectively reduced, and at the same time more space in the cache is reserved for the ordinary data, thereby improving the utilization of the cache space and the read hit rate of the cache, and enhancing read performance of the storage system. It can be seen that the data writing method provided by this application achieves the minimum write traffic to the cache and improves the efficiency of the write policy. This application also discloses a data writing device, a storage server, and a computer readable storage medium, which can also achieve the above technical effects.

It is understandable that the above general descriptions and the following detailed descriptions are merely exemplary and cannot limit this application.

BRIEF DESCRIPTION OF THE DRAWINGS

To describe the embodiments of this application or the technical solutions of related arts more clearly, the following briefly introduces the accompanying drawings required for describing the embodiments or the related arts. Apparently, the accompanying drawings in the following description show only some embodiments of this application, and a person of ordinary skill in the art may still derive other drawings from these accompanying drawings without creative efforts. The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DESCRIPTION OF EMBODIMENTS

In typical cloud block storage products, such as Tencent CBS and Ceph (a distributed file system), when a client generates a write request, write data corresponding to the write request is first written to a write buffer, and at the same time is sequentially recorded in a log file. When the amount of dirty data in the write buffer exceeds a certain threshold, data in the write buffer will be submitted to a cache, for example, a Solid State Drive (SSD) cache. The write data in the cache will be further asynchronously flushed to a back-end hard disk drive (HDD) storage based on the write-back policy.

However, inventors of this application find that in the Input/Output (IO) logs collected by the CBS in one month, 47.09% of the data only has the write operation, that is, 47.09% of the data is write-only data. Because a read request of a user will not hit such write-only data, submitting the write-only data to the cache does not enable the user to perceive the corresponding acceleration effect, while for the cache, writing the write-only data to the cache using either the write-back policy or the write-through policy causes a lot of unnecessary write traffic to the cache. In addition, simply deploying the write-around policy for all types of data will affect reading experience of the user for other non-write-only data (that is, ordinary data), which inevitably reduces the hit rate of read requests and severely reduces service quality.

Therefore, in this application, the data generated by the client is divided into write-only data and ordinary data. Because the write-only data has only the write operation within a certain time window, the write-around policy can be used for writing data to the back-end hard disk drive. Because the ordinary data may have the read operation in a certain time window, the write-through policy or the write-back policy may be used for writing data to the cache. In this way, writing write-only data directly to the back-end hard disk drive can effectively reduce the useless traffic written to the cache, and at the same time reserve more space for ordinary data in the cache, thereby improving the utilization of the cache space, and improving the read hit rate of the cache.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

Figure 1:
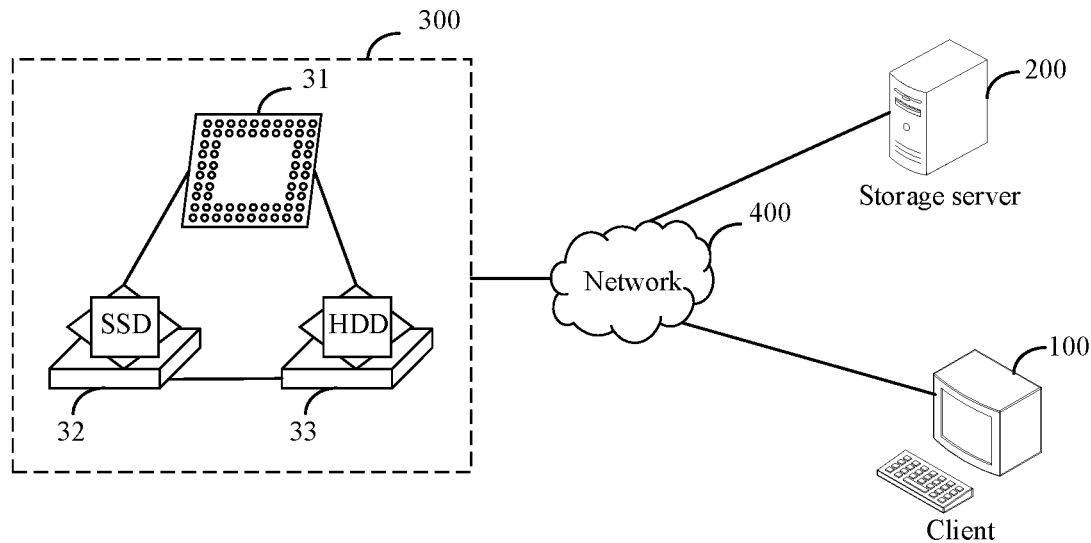
FIG. 1 is an architectural view of a data writing system provided by an embodiment of this application.

In order to facilitate understanding of the data writing method provided by this application, a system used by the method is introduced first. FIG. 1 is an architectural view of a data writing system provided by an embodiment of this application. As shown in FIG. 1, the data writing system includes a client 100, a storage server 200, and a storage region 300. Write data is transmitted between the client 100 and the storage server 200 and between the storage server 200 and the storage region 300 through a network 400.

The storage region 300 includes a write buffer 31, a cache (SSD) 32, and a back-end hard disk drive (HDD) 33. When the client 100 generates a write request, write data corresponding to the write request is first written to the write buffer 31. The write buffer 31 may be composed of a Dynamic Random Access Memory (DRAM), which is not specifically limited herein. When the write buffer 31 is triggered for a data flushing operation, the storage server 200 determines a data type of to-be-flushed data, and if it is write-only data, the write-only data is directly written to the back-end hard disk drive 33; otherwise, the data is written to the cache 32 and the hard disk drive 33 simultaneously by using a write-through policy, or the data is first written to the cache 32 and then asynchronously flushed to the hard disk drive 33 by using a write-back policy, which is not specifically limited herein. The cache 32 is configured to temporarily store data. When the client generates a read request, if data corresponding to the read request is in the cache 32, the data can be returned directly without accessing the back-end hard disk drive 33, thereby improving reading efficiency. The cache 32 in this embodiment may be an SSD cache, which is not specifically limited herein.

Embodiments of this application disclose a data writing method, which improves efficiency of the write policy.

Figure 2:
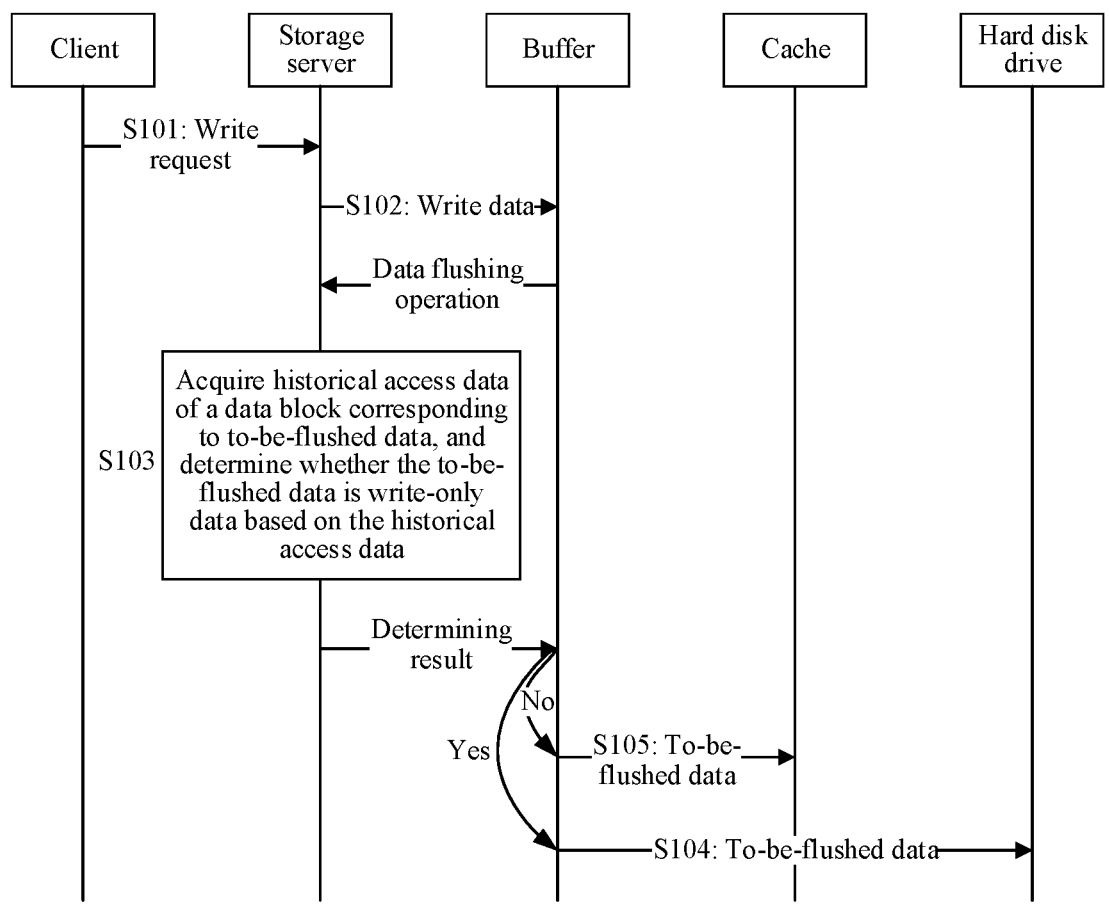
FIG. 2 is a flowchart of a first data writing method provided by an embodiment of this application.

FIG. 2 is a flowchart of a data writing method provided by an embodiment of this application, including:

S101: A client generates a write request, and sends the write request to a storage server.

In this step, the client generates the write request. The write request includes write data, and a write address can also be specified in the write request, which is not specifically limited herein. The client sends the write request to the storage server, so that the storage server processes the write data corresponding to the write request according to a predefined write policy.

S102: The storage server writes the write data corresponding to the write request to a write buffer.

In this step, the write data corresponding to all write requests generated by the client is written to the write buffer first, and then sequentially recorded in a log file. The log file is used for data recovery.

S103: The storage server acquires historical access data of a data block corresponding to to-be-flushed data in the write buffer when a data flushing operation is triggered for the write buffer, and determines whether the to-be-flushed data is write-only data based on the historical access data; if yes, proceed to S104; and if no, proceed to S105.

The objective of this step is to determine the type of the to-be-flushed data, that is to say, to determine whether the to-be-flushed data is write-only data or ordinary data, so that different write policies can be subsequently applied for different types of data. The write-only data is data that has only the write operation but no read operation within a certain time window, and data other than the write-only data is referred to as the ordinary data.

The storage server determines the to-be-flushed data in the write buffer and acquires the historical access data of the data block corresponding to the to-be-flushed data when the data flushing operation is triggered for the write buffer. When the client generates the write request, the write address can be specified, and the data block here is the data block corresponding to the write address. The historical access data of a data block can represent the historical access situation of the data block, and the probability that the data block stores write-only data can be determined according to the historical access data, thereby determining whether the to-be-flushed data to be stored in the data block is the write-only data.

In this embodiment, the specific method for determining the data type is not limited. For example, the data type of the to-be-flushed data can be determined based on a statistical method or a classifier, which is within the protection scope of this embodiment.

It is understandable that the trigger condition for the data flushing operation is not limited in this step. For example, the data flushing operation can be triggered when the data amount of the write buffer reaches a threshold. That is, the step of acquiring historical access data of the data block corresponding to the to-be-flushed data when a data flushing operation is triggered for the write buffer includes: triggering the data flushing operation for the write buffer when the data amount in the write buffer reaches a threshold, and acquiring the historical access data of the data block corresponding to the to-be-flushed data.

S104: The storage server writes the to-be-flushed data to a hard disk drive.

It is understandable that the cache is configured to temporarily store data. When the client generates a read request, if the data corresponding to the read request is stored in the cache, the data can be returned directly to the client without accessing the back-end hard disk drive, which has better reading efficiency. The write-only data has only the write operation but no read operation within a certain time window, so loading the write-only data to the cache does not increase the read hit rate of the cache, but causes a large amount of unnecessary write traffic to the cache.

Therefore, in this step, the write-around policy is used for the write-only data, that is, when the to-be-flushed data is the write-only data, the to-be-flushed data is directly written to the back-end hard disk drive, thereby reserving more space for the ordinary data in the cache, and improving the utilization of cache space and the read hit rate of the cache.

In a specific implementation, in order to further save the cache space, prevent dirty data corresponding to the to-be-flushed data in the cache, and ensure data consistency, it is first queried whether the dirty data corresponding to the to-be-flushed data exists in the cache, and if yes, the dirty data in the cache is refreshed to the hard disk drive first, and then the to-be-flushed data in the write buffer is written to the hard disk drive. That is, this step includes: refreshing the dirty data corresponding to the to-be-flushed data in the cache to the hard disk drive; and writing the to-be-flushed data to the hard disk drive. In some embodiments, the dirty data, which is also referred to as "rogue data", refers to inaccurate, incomplete, inconsistent, outdated or even duplicated data existing in a computer system or database.

S105: The storage server writes the to-be-flushed data to the cache.

Because the ordinary data has the read operation, it is necessary to write the ordinary data to the cache to improve read performance of the storage system. In this step, the write-through policy or the write-back policy can be used for the ordinary data, which is not limited herein.

If the write policy used for the ordinary data is the write-through policy, this step includes: writing the to-be-flushed data to the cache and the hard disk drive simultaneously.

If the write policy used for the ordinary data is the write-back policy, this step includes: writing the to-be-flushed data to the cache, and refreshing data in the cache to the hard disk drive when a preset condition is met. The preset condition here may be: the read hit rate is smaller than a preset value, that is, when the read hit rate of the cache is smaller than the preset value, the data in the data block with the low read hit rate in the cache is refreshed to the hard disk drive. The preset condition here may also be: the cache is full, that is, when the cache is full, a part of the data in the cache is refreshed to the hard disk drive. Certainly, refreshing the data in the cache to the hard disk drive may also be triggered by other preset conditions, which are not specifically limited herein.

In the embodiments of this application, data generated by the client is divided into different types: write-only data and ordinary data. The write-only data has only the write operation but no read operation within a certain time window, that is, the read request of the client will not hit the write-only data in the time window. Therefore, loading the write-only data to the cache does not increase the read hit rate of the cache, but causes a large amount of unnecessary write traffic to the cache. Based on this, the data writing method provided by the embodiments of this application writes the write-only data and the ordinary data in different manners. Specifically, the ordinary data is written to the cache using the write-through policy or the write-back policy, while the write-only data is written directly to the back-end hard disk drive using the write-around policy. In this manner, the useless traffic written to the cache can be effectively reduced, and more space in the cache is reserved for the ordinary data, thereby improving the utilization of the cache space and the read hit rate of the cache, and enhancing read performance of the storage system. It can be seen from the above description that the data writing method provided by the embodiments of this application achieves the minimum write traffic to the cache and improves the efficiency of the write policy.

Figure 3:
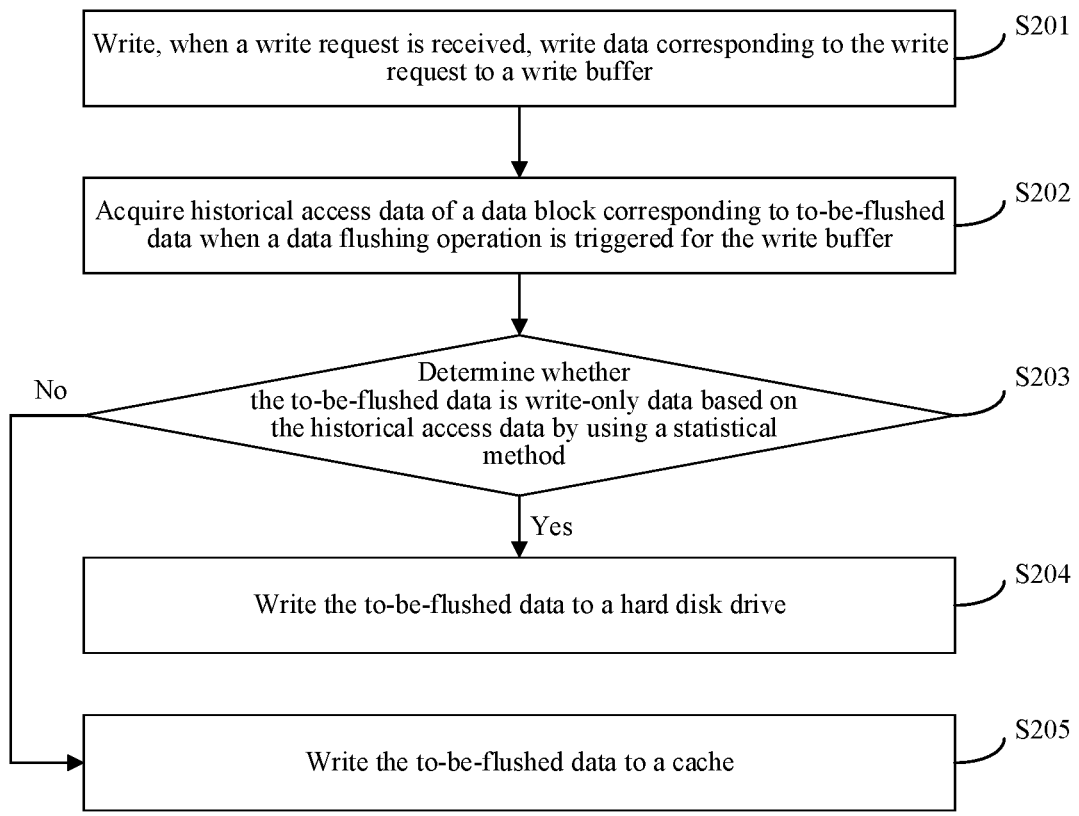
FIG. 3 is a flowchart of a second data writing method provided by an embodiment of this application.

In this embodiment, the type of to-be-flushed data is determined based on statistics, and the method is for example performed by a storage server in the following description. Specifically:

FIG. 3 is a flowchart of a second data writing method provided by an embodiment of this application, including:

S201: Write, when a write request is received, write data corresponding to the write request to a write buffer;

S202: Acquire historical access data of a data block corresponding to to-be-flushed data when a data flushing operation is triggered for the write buffer;

S203: Determine whether the to-be-flushed data is write-only data according to the historical access data based on a statistical algorithm; if yes, proceed to S204; and if no, proceed to S205;

This embodiment uses a statistical method to determine the type of to-be-flushed data based on the historical access data, where the historical access data here is historical access data of the data block corresponding to the to-be-flushed data. When a client generates the write request, a write address can be specified, and the data block here is the data block corresponding to the write address. The historical access data of the data block can describe the historical access situation of the data block, including the number of write requests and read requests within a certain time window. According to the historical access data of the data block, the probability that the data block stores the write-only data can be determined, thereby determining whether the to-be-flushed data to be stored in the data block is the write-only data.

As an exemplary implementation, this step includes: determining the number of write requests for the data block corresponding to the to-be-flushed data in multiple time windows based on the historical access data; calculating a write-only probability of the data block corresponding to the to-be-flushed data according to the number of the write requests, where the write-only probability is used for describing the probability that the data block stores the write-only data; determining whether the write-only probability is greater than a third preset value, if yes, determining that the to-be-flushed data is the write-only data, and if no, determining that the to-be-flushed data is ordinary data.

In specific implementations, the number of write requests and the total number of requests for the data block corresponding to to-be-flushed data in multiple time windows are determined based on historical access data. The time window is not limited herein. For example, one time window may be one day, and multiple time windows may be one month, that is, the number of write requests and total number of requests for the data block every day within a month are determined. The total number of requests includes the number of write requests and the number of read requests. The write request ratio of the data block in each time window is calculated, that is, the ratio of the number of write requests to the total number of requests in each time window is calculated, and then the average value of the write request ratios of all time windows is used as the write-only probability of the data block. The write-only probability can represent the probability that the data block stores the write-only data. When the write-only probability is greater than the third preset value, the data to be stored in the data block can be determined as the write-only data, that is, the to-be-flushed data is the write-only data; otherwise, the to-be-flushed data is determined as the ordinary data.

S204: Write the to-be-flushed data to a hard disk drive;
S205: Write the to-be-flushed data to a cache.

It can be seen that in this embodiment, based on the historical access data of the data block corresponding to the to-be-flushed data, a statistical method is used to determine the type of the to-be-flushed data, and different writing methods are used for the write-only data and the ordinary data: the ordinary data is written to the cache using the write-through policy or the write-back policy, while the write-only data is written directly to the back-end hard disk drive using the write-around policy. In this manner, the useless traffic written to the cache can be effectively reduced, and more space in the cache is reserved for the ordinary data, thereby improving the utilization of the cache space and the read hit rate of the cache, and enhancing read performance of the storage system.

Figure 4:
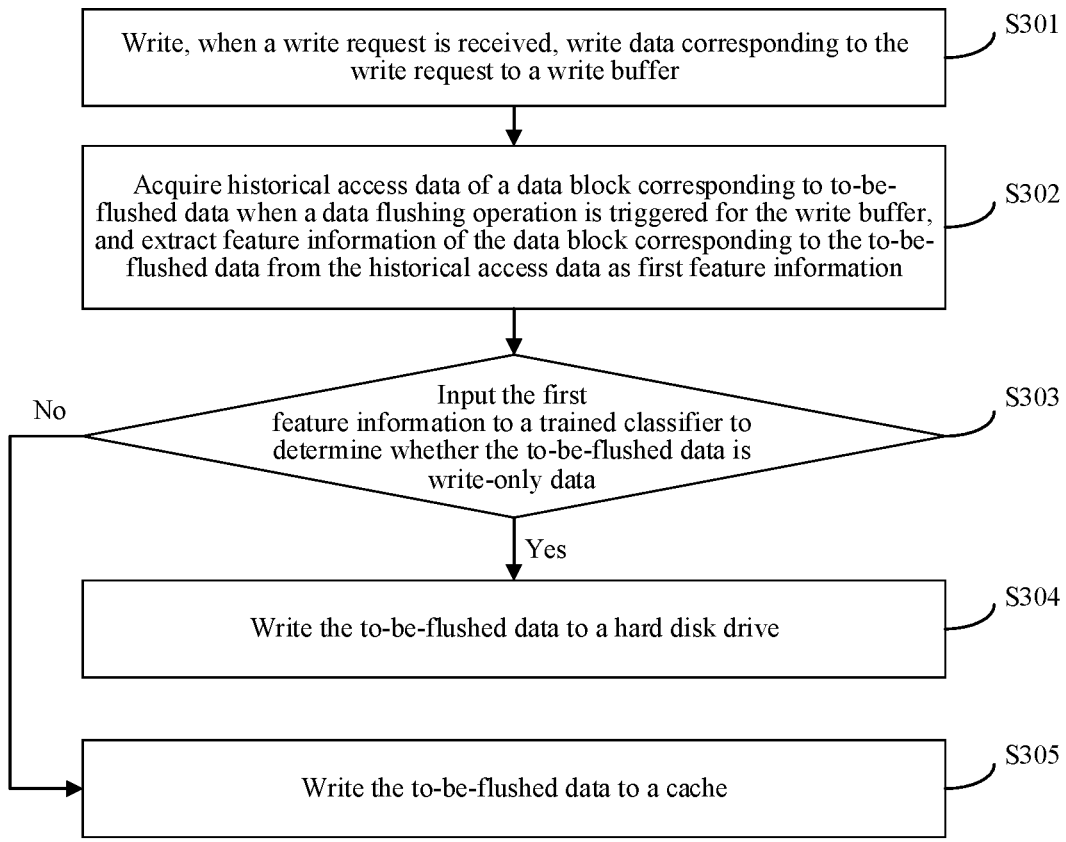
FIG. 4 is a flowchart of a third data writing method provided by an embodiment of this application.

In this embodiment, the type of to-be-flushed data is determined by using a classifier, and the method is for example performed by a storage server in the following description. Specifically:

FIG. 4 is a flowchart of a third data writing method provided by an embodiment of this application, including:

S301: Write, when a write request is received, write data corresponding to the write request to a write buffer;

S302: Acquire historical access data of a data block corresponding to the to-be-flushed data when a data flushing operation is triggered for the write buffer, and extract feature information of the data block corresponding to the to-be-flushed data from the historical access data as first feature information;

In this embodiment, the type of the to-be-flushed data is determined by using a classifier. In this step, the feature information of the data block corresponding to the to-be-flushed data is first extracted from the historical access data of the data block corresponding to the to-be-flushed data, and is used as the first feature information. The feature information here may include any one or two of a time feature and a request type feature. The time feature is a feature used for describing time of accessing the data block, and the request type feature is a feature used for describing a request to access the data block.

Specifically, the time feature may include any one or two of a last access timestamp and an average reuse time difference. The last access timestamp is used for describing a time point of a last access to the data block, and the average reuse time difference is used for describing an average time interval between accesses to the data block. It is understandable that the time feature can represent a new access progress and an access time interval of the data block, that is, the last access timestamp describes the new access progress, and the average reuse time difference describes the access time interval. Definitely, the time interval between the current time and the last access time point of the data block can also be used to indicate the new access progress, which is not specifically limited herein. In addition, the time features can be standardized, for example, the unit of the time feature is set to hour, and the upper limit of the value is limited to 100.

It is understandable that the step of training the classifier exists by default in this embodiment. In specific implementation, a machine learning algorithm can be used for training, and the commonly used feature information in the machine learning algorithm may also be a spatial feature, that is, address information of to-be-written data such as a volume ID and an offset. However, the address changes with time, which affects the prediction of the classifier. Therefore, in this embodiment, the spatial feature is not used, but a request type feature is used to enrich the training feature.

Specifically, the request type feature includes any one or a combination of an average request size, a large request ratio, a small request ratio, and a write request ratio; the large request ratio is used for describing a ratio of requests with a request size greater than a first preset value among requests for accessing the data block, the small request ratio is used for describing a ratio of requests with a request size smaller than a second preset value among requests for accessing the data block, and the write request ratio is used for describing a ratio of write requests among requests for accessing the data block, where the first preset value is greater than or equal to the second preset value.

For example, the average request size is the average size of requests for accessing the data block. The unit may be kilobyte, and the upper limit may be 100 KB. The large request ratio can be the proportion of requests with a request size greater than 64 KB in all access requests, and the small request ratio is the proportion of requests with a request size smaller than 8 KB in all access requests.

If the feature information is collected for each data block, the extraction of the feature information will consume too many system resources, and the memory usage during storage will be excessively high, resulting in low efficiency of feature information extraction. Therefore, in order to improve the efficiency of feature information extraction, the statistical granularity of the feature information can be increased. However, an excessively large statistical granularity will also lead to inaccurate prediction results of the trained classifier. Therefore, a data region can be used as the statistical granularity of feature information, and each data region includes multiple data blocks, thereby balancing the memory usage and the prediction accuracy. The access granularity in the storage system, that is, the minimum read and write granularity is a data block, is for example 8 KB. The size of a data region is an integer multiple of the access granularity, for example, the size of a data region may be 1 MB.

In a specific implementation, for example, a statistical granularity of 1 MB is used for feature information statistics. The feature information of each data region is determined by the historical access data of all data blocks in the data region, and the data blocks in the same data region share the feature information of this data region. That is, the step of acquiring feature information of the data block corresponding to the to-be-flushed data as the first feature information includes: determining a data region to which the data block corresponding to the to-be-flushed data belongs, and extracting feature information of the data region as the first feature information.

S303: Determine whether the to-be-flushed data is write-only data according to the first feature information by using a pre-trained classifier; if yes, proceed to S304; and if no, proceed to S305;

In this step, the first feature information extracted in the previous step is inputted to the pre-trained classifier to obtain the type of the to-be-flushed data. If it is the write-only data, proceed to S304, and if it is ordinary data, proceed to S305.

S304: Write the to-be-flushed data to a hard disk drive;

S305: Write the to-be-flushed data to a cache.

It can be seen that, in this embodiment, the classifier is used for determining the type of to-be-flushed data, and the prediction accuracy of the classifier is relatively high, which improves the accuracy of determining the data type. For the to-be-flushed data in the write buffer, the corresponding classification is first determined by using the classifier, and then different operations are performed according to the classification result, that is, the write-back policy or the write-through policy is used for the ordinary data, and the write-around policy is used for the write-only data. In this manner, the useless traffic written to the cache can be greatly reduced, and more space in the cache is reserved for the ordinary data, thereby improving the utilization of the cache space, and enhancing read performance of the storage system.

Figure 5:
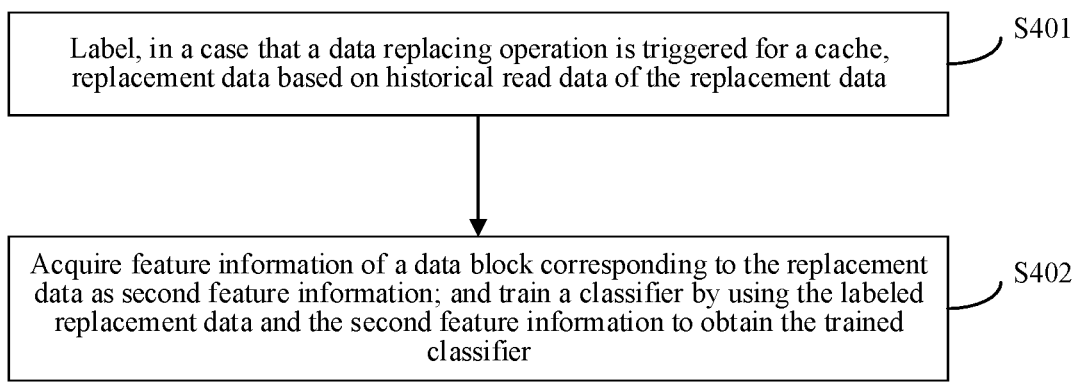
FIG. 5 is a flowchart of a classifier training method provided by an embodiment of this application.

This embodiment trains the classifier based on a machine learning algorithm. Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML, as the core of AI, is a basic way to make the computer intelligent, and is applicable to various fields of AI. The ML and deep learning generally include technologies such as an artificial neural network, a belief network, reinforcement learning, transfer learning, inductive learning, and learning from demonstrations. Specifically:

FIG. 5 is a flowchart of a classifier training method provided by an embodiment of this application, including:

S401: Label, when a data replacing operation is triggered for a cache, replacement data based on historical read data of the replacement data in the cache;

This embodiment uses a machine learning algorithm to train the classifier. The specific machine learning algorithm is not limited herein. Supervised machine learning algorithms can be used, such as naive Bayes, logistic regression, decision tree, AdaBoost, and random forest. The classifier runs on an X86-64 computing server. The server has two Intel Xeon E5-2670-v3 CPUs and 128 GB DRAM. The classification results of different machine learning algorithms are shown in Table 1, and the training time in Table 1 is the time spent on training samples in one day.

TABLE 1

| Classifier name | Precision (%) | Recall (%) | Training time (ms) | Prediction time (ms) |
| --- | --- | --- | --- | --- |
| Logistic regression | 83.54 | 75.21 | 500.84 | 1.01 |
| Naive Bayes | 83.89 | 83.91 | 440.88 | 1.25 |
| Decision tree | 80.96 | 68.61 | 482.62 | 1.16 |
| AdaBoost | 87.85 | 85.64 | 462.47 | 14.73 |
| Random forest | 88.32 | 82.64 | 523.68 | 20.23 |

It can be learned from Table 1 that the random forest is superior to other algorithms in terms of precision, but takes more time to predict, that is, each request requires an average of 20.23 μs. AdaBoost is second only to random forest in terms of precision, and has a shorter prediction time, that is, each request requires an average of 14.73 μs. Naive Bayes can well balance precision, recall and prediction time. Logistic regression is not as good as Naive Bayes in terms of recall, and decision tree has the lowest precision and recall.

In a specific implementation, training samples are collected within a certain time window to train the classifier. For example, collecting training samples every day to train the classifier, and the trained classifier is used for distinguishing the data types of to-be-flushed data the next day. It takes hundreds of milliseconds for all supervised machine learning algorithms to train samples per day, and the size of the classifier model is only a few megabytes. It can be seen that the impact of training the classifier on the storage system is negligible.

In this embodiment, the training sample can be the replacement data, that is, when the data replacing operation is triggered for the cache, in other words, when the first data in the cache is replaced by the second data in the hard disk drive, the first data is the replacement data in this step. The replacement data is labeled based on the historical read data thereof. For example, if the replacement data has one or more read hits, it is labeled 0 (0 means ordinary data); otherwise, it is labeled 1 (1 means write-only data).

S402: Acquire feature information of a data block corresponding to the replacement data as second feature information; and train the classifier by using the labeled replacement data and the second feature information.

In this step, the feature information of the training sample is extracted as the second feature information. The second feature information here may also include a time feature and a request type feature, which is not described again here. The labeled training samples and the feature information of the training samples are inputted to the classifier, and are used for training the classifier to acquire the trained classifier. The trained classifier is used for determining the type of data, that is, the write-only data or the ordinary data.

It is understandable that, in order to improve the extraction efficiency of the feature information of the training sample, the data region can also be used as the statistical granularity of the feature information of the training sample. That is, the step of acquiring feature information of the data block corresponding to the replacement data as the second feature information includes: determining a data region to which the data block corresponding to the replacement data belongs, and extracting feature information of the data region as the second feature information.

It can be seen that, in this embodiment, the machine learning algorithm is used to train the classifier. When the feature information of the training samples is extracted, the request type feature is used to enrich the training features of the classifier, so as to achieve a better classification effect of the classifier and improve the accuracy in determining the data type.

Figure 6:
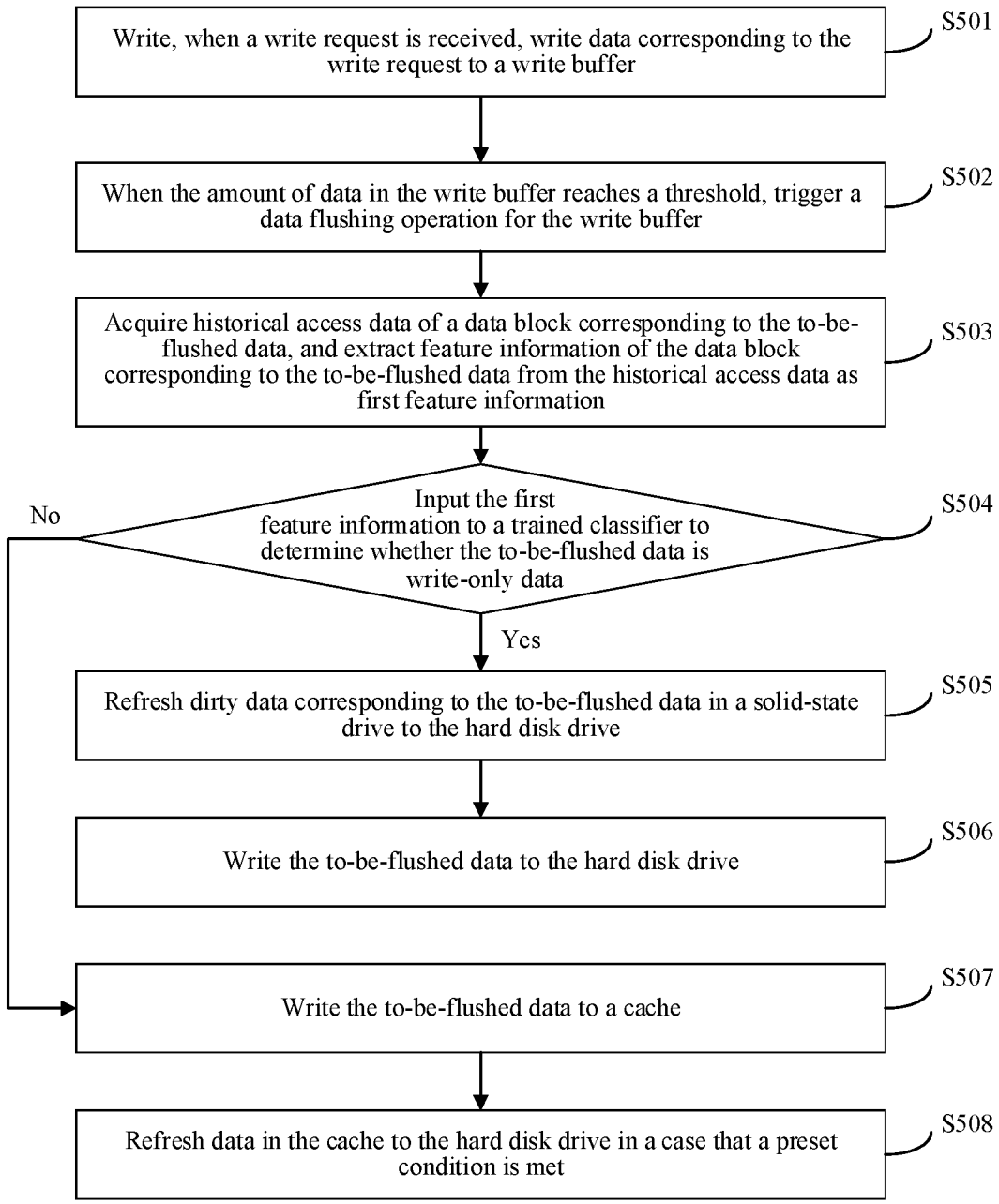
FIG. 6 is a flowchart of a fourth data writing method provided by an embodiment of this application.

An embodiment of this application discloses a data writing method. Compared with the previous embodiments, this embodiment further explains and optimizes the technical solution, and the method is also performed by a storage server. Specifically:

FIG. 6 is a flowchart of a fourth data writing method provided by an embodiment of this application, including:

S501: Write, when a write request is received, write data corresponding to the write request to a write buffer;

S502: When the amount of data in the write buffer reaches a threshold, trigger a data flushing operation for the write buffer;

S503: Acquire historical access data of a data block corresponding to the to-be-flushed data, and extract feature information of the data block corresponding to the to-be-flushed data from the historical access data as first feature information;

S504: Determine whether the to-be-flushed data is write-only data according to the first feature information by using a pre-trained classifier; if yes, proceed to S505; and if no, proceed to S507;

S505: Refresh the dirty data corresponding to the to-be-flushed data in the cache to the hard disk drive;

S506: Write the to-be-flushed data to the hard disk drive;

S507: Write the to-be-flushed data to the cache;

S508: Refresh data in the cache to the hard disk drive when a preset condition is met.

It can be seen that this embodiment provides a write policy based on machine learning, which can identify different types of data accurately, that is, the write-only data and the ordinary data, and then perform different processing on different types of data. The write-back policy is used for the ordinary data, and the write-around policy is used for the write-only data. In this manner, the useless traffic written to the cache can be reduced to the greatest extent, and more space in the cache is reserved for the ordinary data, thereby improving the utilization of the cache space, and enhancing read performance of the storage system.

Figure 7:
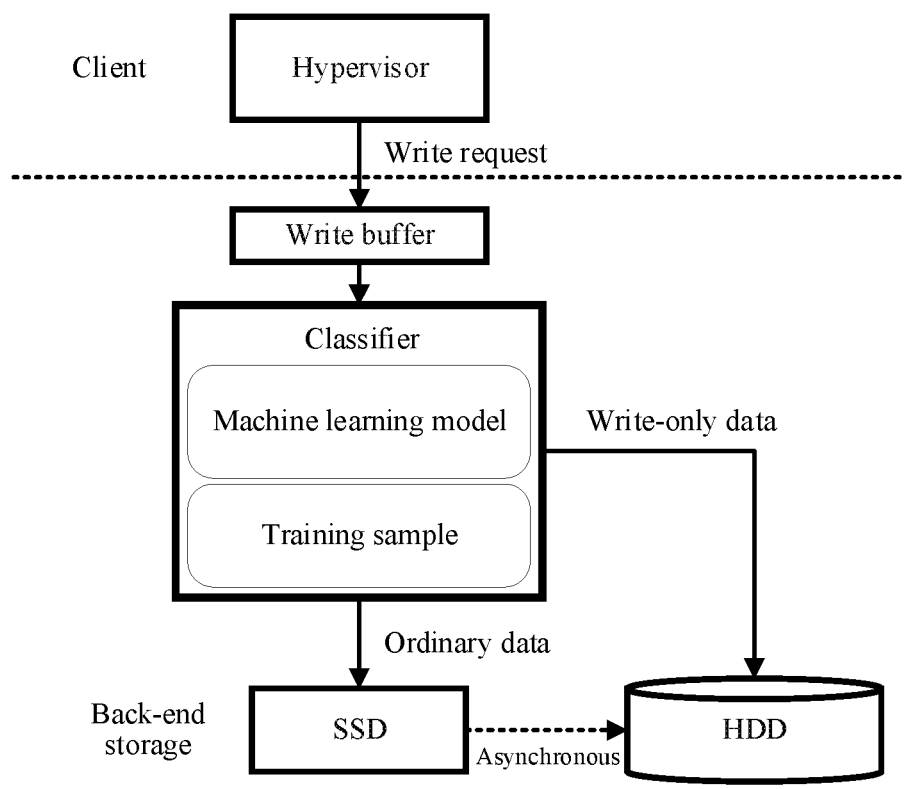
FIG. 7 is a system architectural view of an application embodiment provided by this application.
Figure 8:
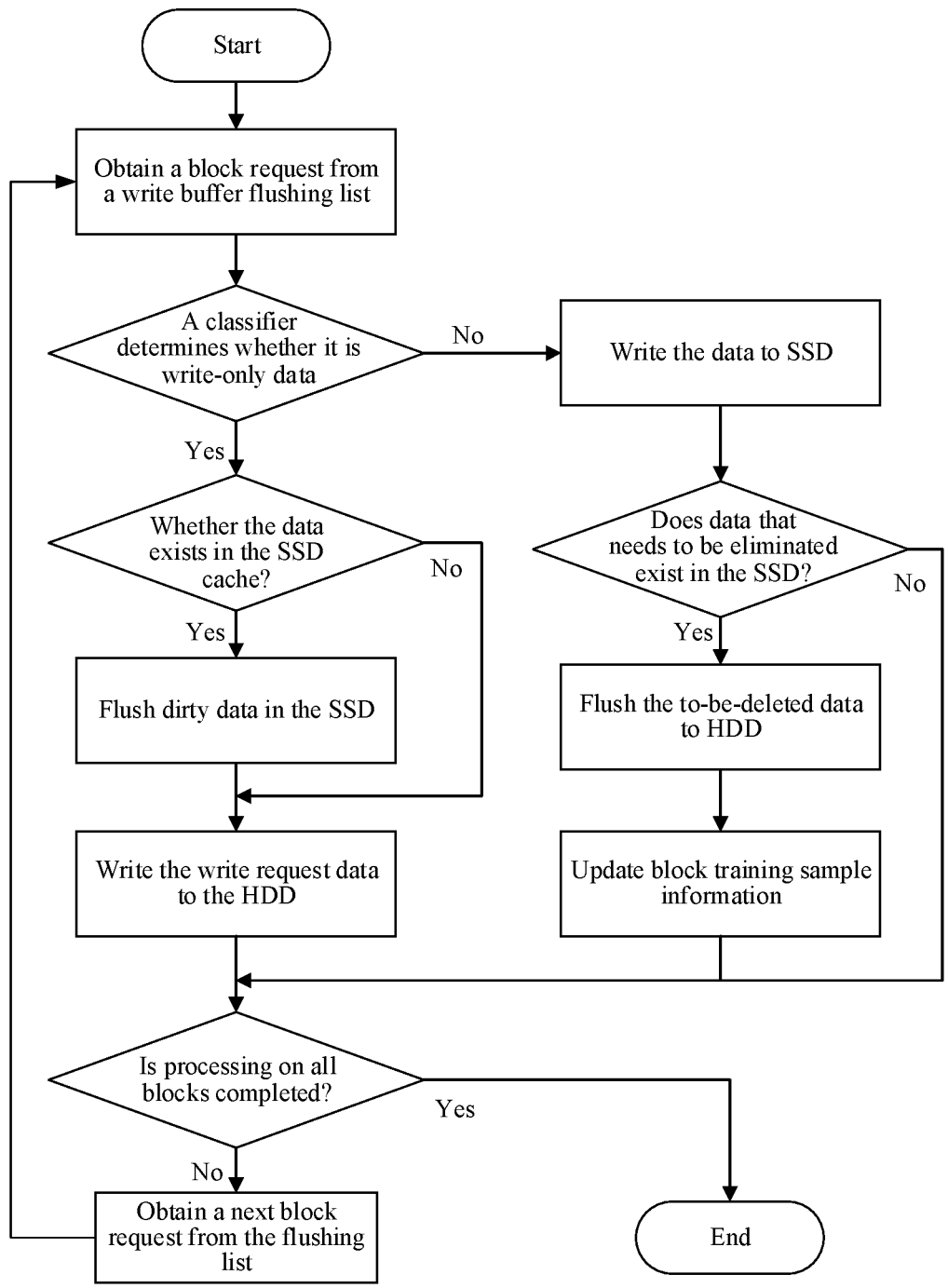
FIG. 8 is a flowchart of an application embodiment provided by this application.

In order to facilitate understanding, the introduction is made in combination with an application scenario of this application. Specifically, as shown in FIG. 7, a data writing system includes a client, a classifier, and a storage region of Tencent CBS (a cloud block storage product). Hypervisor (also known as virtual machine monitor or VMM) is set in the client to monitor the write request of the client. The classifier collects training samples for training a machine learning model. The storage region includes a write buffer and a back-end storage. The back-end storage includes an SSD cache and an HDD. The write policy determines whether to load to-be-written data to the SSD cache and when to flush dirty data in the SSD cache to the HDD. As shown in FIG. 8, when there is a request from the client, the processing flow of the write policy is as follows:

Step one: Write all write data corresponding to the write request to a write buffer, sequentially record the writing in a log file, and notify a storage server when the amount of dirty data in the write buffer reaches a threshold.

Step two: When the data needs to be flushed for the write buffer, the classifier acquires features of the region where the currently refreshed data block is and analyzes a type thereof. If the data stored in the currently refreshed data block is the write-only data, perform step three; if the data is the ordinary data, perform step four.

Step three: Find whether the currently refreshed data block has dirty data in the SSD cache. If yes, first flush the dirty data in the SSD cache, and write the flushing data in the write buffer directly to the HDD, and then the process ends.

Step four: Write the flushing data to the SSD cache, and then use the write-back policy to asynchronously refresh the data to the HDD. The reason for using the write-back policy instead of the write-through policy here is that the SSD is non-volatile. Therefore, the write-back policy is sufficient to ensure data consistency.

In this case, the classifier trains the model once a day to make predictions for the next day. Training samples are collected during the system operation process. When the SSD cache has data that needs to be eliminated, the eliminated data is flushed to the HDD and a training sample is added.

The experimental results are shown in Table 2:

TABLE 2

| Write policy | Hit rate | SSD write traffic | Read latency |
| --- | --- | --- | --- |
| Write-around policy | 92.13% | 1 | 1.29 ms |
| Write-back policy | 94.68% | 7.49 | 934.16 μs |
| Write policy of this embodiment | 97.22% | 4.38 | 583.64 μs |

In Table 2, the write traffic of other policies is standardized as the write traffic of the write policy. The write-around policy achieves the lowest write traffic to the SSD (1). This is because the incorrectly written data is first written to the back-end storage directly. However, the write-around policy has the lowest hit rate of 92.13% and causes the highest read latency of 1.29 ms. It can be seen that although the write-around policy achieves the lowest SSD write traffic, it lowers the cache performance in terms of hit rate and read latency. The write-back policy leads to a maximum write traffic to the SSD (7.49). Compared with the write-back policy, the write policy provided by this embodiment increases the hit rate from 94.68% to 97.22%, an increase of 2.61%, and reduces the read latency and write traffic by 37.52% (from 934.16 μs to 583.64 μs) and 41.52% (from 7.49 to 4.38) respectively. It can be seen that the write policy provided by this embodiment achieves the best performance.

The following describes a data writing device provided by an embodiment of this application. The data writing device described below and the data writing method described above can be cross-referenced.

Figure 9:
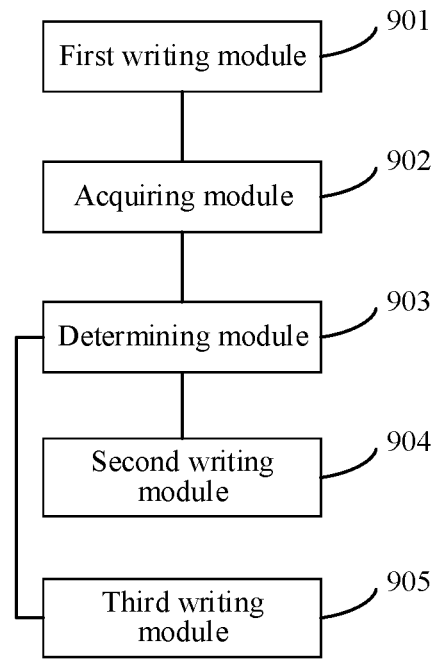
FIG. 9 is a structural view of a data writing device provided by an embodiment of this application.

FIG. 9 is a structural view of a data writing device provided by an embodiment of this application, including:
- a first writing module 901, configured to write, when a write request is received, write data corresponding to the write request to a write buffer;
- an acquiring module 902, configured to acquire historical access data of a data block corresponding to to-be-flushed data in the write buffer when a data flushing operation is triggered for the write buffer;
- a determining module 903, configured to determine whether the to-be-flushed data is write-only data based on the historical access data;
- a second writing data 904, configured to write the to-be-flushed data to a hard disk drive when the to-be-flushed data is the write-only data; and
- a third writing data 905, configured to write the to-be-flushed data to a cache when the to-be-flushed data is not the write-only data.

In the embodiments of this application, data generated by the client is divided into different types: write-only data and ordinary data. The write-only data has only the write operation but no read operation within a certain time window, so loading the write-only data to the cache does not increase the read hit rate of the cache, but causes a large amount of unnecessary write traffic to the cache. Therefore, the data writing device provided by this embodiment of this application uses different writing methods for the write-only data and the ordinary data. The write-through policy or write-back policy is used to write the ordinary data to the cache, and the write-around policy is used to write the write-only data directly to the back-end hard disk drive. In this manner, the useless traffic written to the cache can be effectively reduced, and more space in the cache is reserved for the ordinary data, thereby improving the utilization of the cache space and the read hit rate of the cache, and enhancing read performance of the storage system. It can be seen that the data writing device provided by this embodiment of this application achieves the minimum write traffic to the cache and improves the efficiency of the write policy.

On the basis of the foregoing embodiment, the second writing module 904 includes:
- a first refreshing unit, configured to refresh dirty data corresponding to the to-be-flushed data in the cache to the hard disk drive; and
- a first writing unit, configured to write the to-be-flushed data to the hard disk drive.

On the basis of the foregoing embodiment, the third writing module 905 includes:
- a second writing unit, configured to write the to-be-flushed data to the cache; and
- a second refreshing unit, configured to refresh data in the cache to the hard disk drive when a preset condition is met.

On the basis of the foregoing embodiment, the third writing module 905 is specifically configured to: write the to-be-flushed data to the cache and the hard disk drive simultaneously.

On the basis of the foregoing embodiment, the acquiring module 902 is specifically configured to: trigger a data flushing operation for the write buffer and acquire historical access data of a data block corresponding to the to-be-flushed data in the write buffer when the amount of data in the write buffer reaches a threshold.

On the basis of the foregoing embodiment, the determining module 903 is specifically configured to: extract feature information of a data block corresponding to the to-be-flushed data from the historical access data as first feature information; determine whether the to-be-flushed data is the write-only data according to the first feature information by using a pre-trained classifier.

On the basis of the foregoing embodiment, the device further includes:
- a labeling module, configured to label, when a data replacing operation is triggered for a cache, replacement data based on historical read data of the replacement data in the cache; and
- a training module, configured to acquire feature information of a data block corresponding to the replacement data as second feature information; and train the classifier by using the labeled replacement data and the second feature information.

On the basis of the foregoing embodiment, the training module includes:
- a determining unit, configured to determine a data region to which the data block corresponding to the replacement data belongs; the data region having a plurality of data blocks, and a size of the data region being an integer multiple of access granularity; and
- an extraction unit, configured to extract feature information of the data region as the second feature information; and
- a training module, configured to train the classifier by using the labeled replacement data and the second feature information.

On the basis of the foregoing embodiment, the feature information includes at least one of a time feature and a request type feature; the time feature is a feature used for describing time of accessing a data block, and the request type feature is a feature used for describing a request for accessing a data block.

On the basis of the foregoing embodiment, the time feature includes at least one of a last access timestamp and an average reuse time difference; the last access timestamp is used for describing a time point of a last access to the data block, and the average reuse time difference is used for describing an average time interval for accessing the data block; and the request type feature includes any one or a combination of an average request size, a large request ratio, a small request ratio, and a write request ratio; the large request ratio is used for describing a ratio of requests with a request size greater than a first preset value among requests for accessing the data block, the small request ratio is used for describing a ratio of requests with a request size smaller than a second preset value among requests for accessing the data block, and the write request ratio is used for describing a ratio of write requests among requests for accessing the data block, where the first preset value is greater than or equal to the second preset value.

On the basis of the foregoing embodiment, the determining module 903 is specifically configured to: determine, based on a statistical algorithm, whether the to-be-flushed data is the write-only data according to the historical access data.

On the basis of the foregoing embodiment, the determining module 903 includes:

a calculating unit, configured to determine the number of write requests for the data block corresponding to the to-be-flushed data in multiple time windows based on the historical access data, and calculate a write-only probability of the data block corresponding to the to-be-flushed data according to the number of the write requests; the write-only probability being used for describing a probability that the data block stores the write-only data; and a determining unit, configured to determine whether the write-only probability is greater than a third preset value, if yes, determine that the to-be-flushed data is the write-only data, and if no, determine that the to-be-flushed data is ordinary data.

For the apparatus in the foregoing embodiments, a specific manner in which each module performs an operation is already described in detail in the embodiments related to the method, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 10:
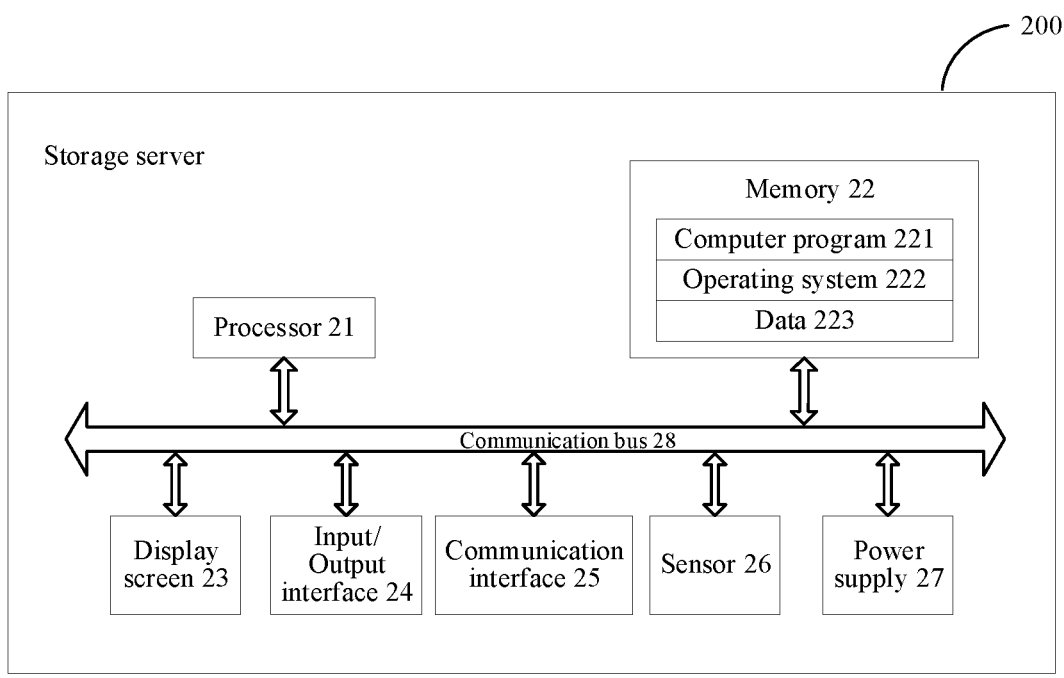
FIG. 10 is a structural view of a storage server provided by an embodiment of this application.

This application also provides a storage server. FIG. 10 is a structural view of a storage server 200 provided by an embodiment of this application, including a processor 21 and a memory 22.

The processor 21 may include multiple processing cores. For example, the processor 21 may be a 4-core processor or an 8-core processor. The processor 21 may be implemented in at least one hardware form of a digital signal processor (DSP), a field-programmable gate array (FPGA), and a programmable logic array (PLA). The processor 21 may also include a main processor and a coprocessor. The main processor is a processor configured to process data in an awake state, and is also referred to as a central processing unit (CPU). The coprocessor is a low power consumption processor configured to process the data in a standby state. In some embodiments, a graphics processing unit (GPU) may be integrated into the processor 21. The GPU is configured to render and draw content to be displayed on a display screen. In some embodiments, the processor 21 may further include an artificial intelligence (AI) processor. The AI processor is configured to process computing operations related to machine learning.

The memory 22 may include multiple computer-readable storage media. The computer-readable storage media may be non-transient. The memory 22 may further include a high-speed random access memory and a nonvolatile memory, for example, multiple disk storage devices or flash storage devices. In this embodiment, the memory 22 is configured to store at least the following computer program 221. After being loaded and executed by the processor 21, the computer program can implement the related steps of the data writing method performed on the server side disclosed in any of the foregoing embodiments. In addition, the resources stored in the memory 22 may also include an operating system 222 and data 223. The storage mode may be transient storage or permanent storage. The operating system 222 may include Windows, Unix, Linux, and so on.

In some embodiments, the storage server 200 may further include a display screen 23, an input/output interface 24, a communication interface 25, a sensor 26, a power supply 27, and a communication bus 28.

Definitely, the structure of the storage server shown in FIG. 10 does not constitute a limitation on the storage server in the embodiments of this application. In actual applications, the storage server may include more or fewer components than those shown in FIG. 10, or combine certain parts.

In another exemplary embodiment, a computer readable storage medium including program instructions is provided; when being performed by a processor, the program instructions implement steps of the data writing method performed by the storage server in any of the foregoing embodiments.

In another exemplary embodiment, a computer program product is provided, including instructions; the instructions, when being run on a computer, cause the computer to perform the data writing method in any of the foregoing embodiments.

The embodiments in this specification are all described in a progressive manner. Description of each of the embodiments focuses on differences from other embodiments, and reference may be made to each other for the same or similar parts among the embodiments. The device embodiments basically correspond to the method embodiments and therefore are only briefly described, and reference may be made to the method embodiments for the associated part. A person of ordinary skill in the art may make various improvements and modifications without departing from the principle of this application. All such improvements and modifications shall also fall within the protection scope of the claims of this application.

The relational terms herein such as first and second are used only to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

What is claimed is:

1. A data writing method performed by a computer device, comprising:

writing, when a write request is received, write data corresponding to the write request to a write buffer;

in response to the amount of data in the write buffer reaches a threshold:

acquiring historical access data of a data block corresponding to to-be-flushed data in the write buffer when a data flushing operation is triggered for the write buffer;

determining whether the to-be-flushed data is write-only data based on the historical access data;
in accordance with a determination that the to-be-flushed data is the write-only data, writing the to-be-flushed data to a hard disk drive; and
in accordance with a determination that the to-be-flushed data is not the write-only data, writing the to-be-flushed data to a cache.

2. The data writing method according to claim 1, wherein the determining whether the to-be-flushed data is write-only data based on the historical access data comprises:
extracting feature information of the data block corresponding to the to-be-flushed data from the historical access data as first feature information; and
determining whether the to-be-flushed data is the write-only data according to the first feature information by using a pre-trained classifier.

3. The data writing method according to claim 2, further comprising:
labeling, when a data replacing operation is triggered for the cache, replacement data based on historical read data of the replacement data in the cache;
acquiring feature information of a data block corresponding to the replacement data as second feature information; and
training the classifier by using the labeled replacement data and the second feature information.

4. The data writing method according to claim 3, wherein the acquiring feature information of a data block corresponding to the replacement data as second feature information comprises:
determining a data region to which the data block corresponding to the replacement data belongs; the data region having a plurality of data blocks, and a size of the data region being an integer multiple of access granularity; and
extracting feature information of the data region as the second feature information.

5. The data writing method according to claim 2, wherein the feature information comprises at least one of a time feature and a request type feature; the time feature is a feature used for describing time of accessing a data block, and the request type feature is a feature used for describing a request for accessing a data block.

6. The data writing method according to claim 5, wherein the time feature comprises at least one of a last access timestamp and an average reuse time difference; the last access timestamp is used for describing a time point of a last access to the data block, and the average reuse time difference is used for describing an average time interval for accessing the data block; and
the request type feature comprises any one or a combination of an average request size, a large request ratio, a small request ratio, and a write request ratio; the large request ratio is used for describing a ratio of requests with a request size greater than a first preset value among requests for accessing the data block, the small request ratio is used for describing a ratio of requests with a request size smaller than a second preset value among requests for accessing the data block, and the write request ratio is used for describing a ratio of write requests among requests for accessing the data block, wherein the first preset value is greater than or equal to the second preset value.

7. The data writing method according to claim 1, wherein the determining whether the to-be-flushed data is write-only data based on the historical access data comprises:
determining, based on a statistical algorithm, whether the to-be-flushed data is the write-only data according to the historical access data.

8. The data writing method according to claim 7, wherein the determining, based on a statistical algorithm, whether the to-be-flushed data is the write-only data based on the historical access data comprises:
determining, based on the historical access data, the number of write requests for a data block corresponding to the to-be-flushed data in a plurality of time windows;
calculating a write-only probability of the data block corresponding to the to-be-flushed data according to the number of the write requests; the write-only probability being used for describing a probability that the data block stores the write-only data; and
determining whether the write-only probability is greater than a third preset value, if yes, determining that the to-be-flushed data is the write-only data, and if no, determining that the to-be-flushed data is ordinary data.

9. The data writing method according to claim 1, wherein the writing the to-be-flushed data to a hard disk drive comprises:
refreshing dirty data corresponding to the to-be-flushed data in the cache to the hard disk drive; and
writing the to-be-flushed data to the hard disk drive.

10. The data writing method according to claim 1, wherein the writing the to-be-flushed data to a cache comprises:
writing the to-be-flushed data to the cache; and
refreshing data in the cache to the hard disk drive when a preset condition is met.

11. The data writing method according to claim 1, wherein the writing the to-be-flushed data to a cache comprises:
writing the to-be-flushed data to the cache and the hard disk drive.

12. A computer device, comprising:
a processor and a memory; and
the memory storing a plurality of computer programs, and the computer programs, when executed by the processor, causing the computer device to perform a data writing method including:
writing, when a write request is received, write data corresponding to the write request to a write buffer;
in response to the amount of data in the write buffer reaches a threshold:
acquiring historical access data of a data block corresponding to to-be-flushed data in the write buffer when a data flushing operation is triggered for the write buffer;
determining whether the to-be-flushed data is write-only data based on the historical access data;
in accordance with a determination that the to-be-flushed data is the write-only data, writing the to-be-flushed data to a hard disk drive; and
in accordance with a determination that the to-be-flushed data is not the write-only data, writing the to-be-flushed data to a cache.

13. The computer device according to claim 12, wherein the determining whether the to-be-flushed data is write-only data based on the historical access data comprises:
extracting feature information of the data block corresponding to the to-be-flushed data from the historical access data as first feature information; and
determining whether the to-be-flushed data is the write-only data according to the first feature information by using a pre-trained classifier.

14. The computer device according to claim 13, wherein the data writing method further comprises:
- labeling, when a data replacing operation is triggered for the cache, replacement data based on historical read data of the replacement data in the cache;
- acquiring feature information of a data block corresponding to the replacement data as second feature information; and
- training the classifier by using the labeled replacement data and the second feature information.

15. The computer device according to claim 14, wherein the acquiring feature information of a data block corresponding to the replacement data as second feature information comprises:
- determining a data region to which the data block corresponding to the replacement data belongs; the data region having a plurality of data blocks, and a size of the data region being an integer multiple of access granularity; and
- extracting feature information of the data region as the second feature information.

16. The computer device according to claim 13, wherein the feature information comprises at least one of a time feature and a request type feature; the time feature is a feature used for describing time of accessing a data block, and the request type feature is a feature used for describing a request for accessing a data block.

17. A non-transitory computer readable storage medium storing a plurality of computer programs, and the computer programs, when executed by a processor of a computer device, causing the computer device to perform a data writing method including:
- writing, when a write request is received, write data corresponding to the write request to a write buffer;
- in response to the amount of data in the write buffer reaches a threshold:
  - acquiring historical access data of a data block corresponding to to-be-flushed data in the write buffer when a data flushing operation is triggered for the write buffer;
  - determining whether the to-be-flushed data is write-only data based on the historical access data;
  - in accordance with a determination that the to-be-flushed data is the write-only data, writing the to-be-flushed data to a hard disk drive; and
  - in accordance with a determination that the to-be-flushed data is not the write-only data, writing the to-be-flushed data to a cache.

18. The non-transitory computer readable storage medium according to claim 17, wherein the determining whether the to-be-flushed data is write-only data based on the historical access data comprises:
- extracting feature information of the data block corresponding to the to-be-flushed data from the historical access data as first feature information; and
- determining whether the to-be-flushed data is the write-only data according to the first feature information by using a pre-trained classifier.

19. The non-transitory computer readable storage medium according to claim 18, wherein the data writing method further comprises:
- labeling, when a data replacing operation is triggered for the cache, replacement data based on historical read data of the replacement data in the cache;
- acquiring feature information of a data block corresponding to the replacement data as second feature information; and
- training the classifier by using the labeled replacement data and the second feature information.

20. The non-transitory computer readable storage medium according to claim 18, wherein the data writing method further comprises, wherein the feature information comprises at least one of a time feature and a request type feature; the time feature is a feature used for describing time of accessing a data block, and the request type feature is a feature used for describing a request for accessing a data block.

* * * * *